Jan. 30, 1951  R. E. BRANCH  2,539,723
TUBE DEBURRING MACHINE
Filed April 11, 1945  3 Sheets-Sheet 2

INVENTOR.
ROBERT E. BRANCH
BY *William E. Hall*
ATTORNEY

INVENTOR.
ROBERT E. BRANCH
BY William E. Hall
ATTORNEY

Patented Jan. 30, 1951

2,539,723

UNITED STATES PATENT OFFICE 2,539,723

TUBE DEBURRING MACHINE

Robert E. Branch, Los Angeles, Calif., assignor to James W. Bell, Los Angeles, Calif.

Application April 11, 1945, Serial No. 587,731

2 Claims. (Cl. 82—2.7)

My invention relates to a machine for machining or deburring the ends of long members which have been cut to lengths, and particularly to a machine of this class for machining or deburring the ends of tubes.

One of the principal objects of my invention is to provide a machine of this class whereby the opposite ends of a long member, such as a tube, may be machined or deburred, and specifically a machine of this class whereby the opposite ends are machined or deburred simultaneously.

Another important object of this invention is to provide a machine of this class whereby such operation of machining or deburring is done quickly, simply, accurately, and automatically.

An important object also of this invention is to provide novel and novelly arranged cutters for effecting such operation.

A further important object of this invention is to provide novel means for feeding the articles to be machined, such as tubes, between opposed cutters for effecting the operation mentioned, and for rigidly holding such articles in position while performing and completing the operation, and also for automatically, simply, and efficiently accomplishing the holding or clamping and the releasing of the finished article.

A still further object of this invention is to provide a simple and efficient mechanism for synchronizing the several movements of the various elements of the machine for effectively carrying out the aforementioned operations.

With these and other objects in view, as will appear hereinafter, I have devised a deburring machine, of the class mentioned, having certain novel features of construction, combination, and arrangement of parts and portions, as will be hereinafter described in detail, and particularly set forth in the appended claims, reference being had to the accompanying drawings, and to the characters of reference thereon, which form a part of this application, in which:

Figure 1:
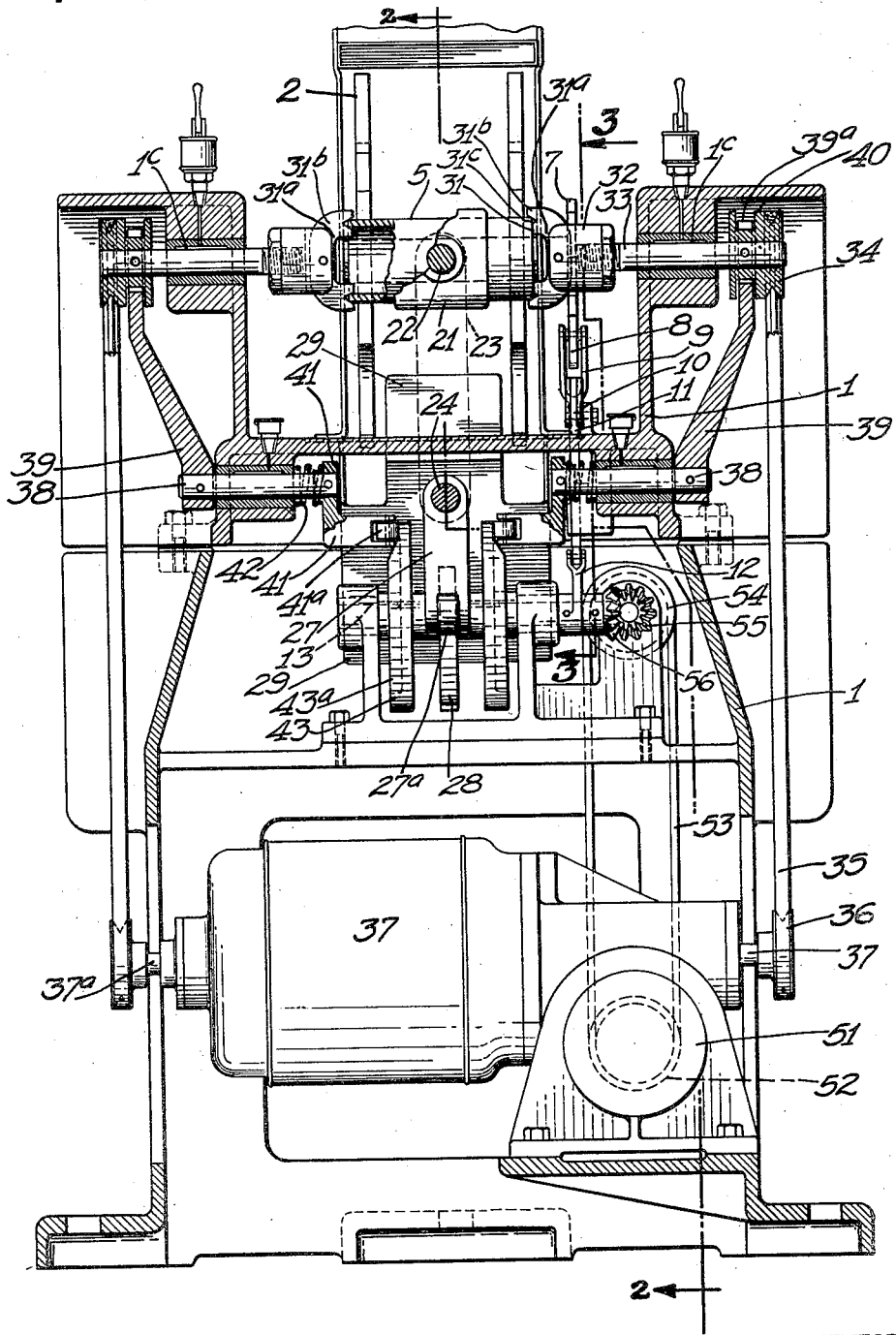
Fig. 1 is a fragmentary front sectional elevation of my machine, in one form of construction, with the section taken through 1—1 of Fig. 2, also showing other parts broken away and in section to facilitate the illustration.

My machine, as shown in the drawings, is supported on a frame 1. The feed mechanism of my machine, for feeding tubes, which have been cut to lengths, to the machine, as shown, comprises a rotary carrier which consists of a pair of axially spaced apart discs 2 which are carried on a shaft 3. This shaft is revolubly mounted on a pair of brackets 4 supported on and extending above the main frame 1. The discs 2 have evenly spaced notches 2ª in their peripheries, the notches of each disc being aligned with each other to form a plurality of cradles for receiving and carrying in the successive notches the articles or tubes 5 to be machined, as shown best in Fig. 1. These carrier discs are positioned below the mouth of a storage and feed hopper 6 supported on the portions of the brackets 4 which extend above the carrier discs.

Figure 2:
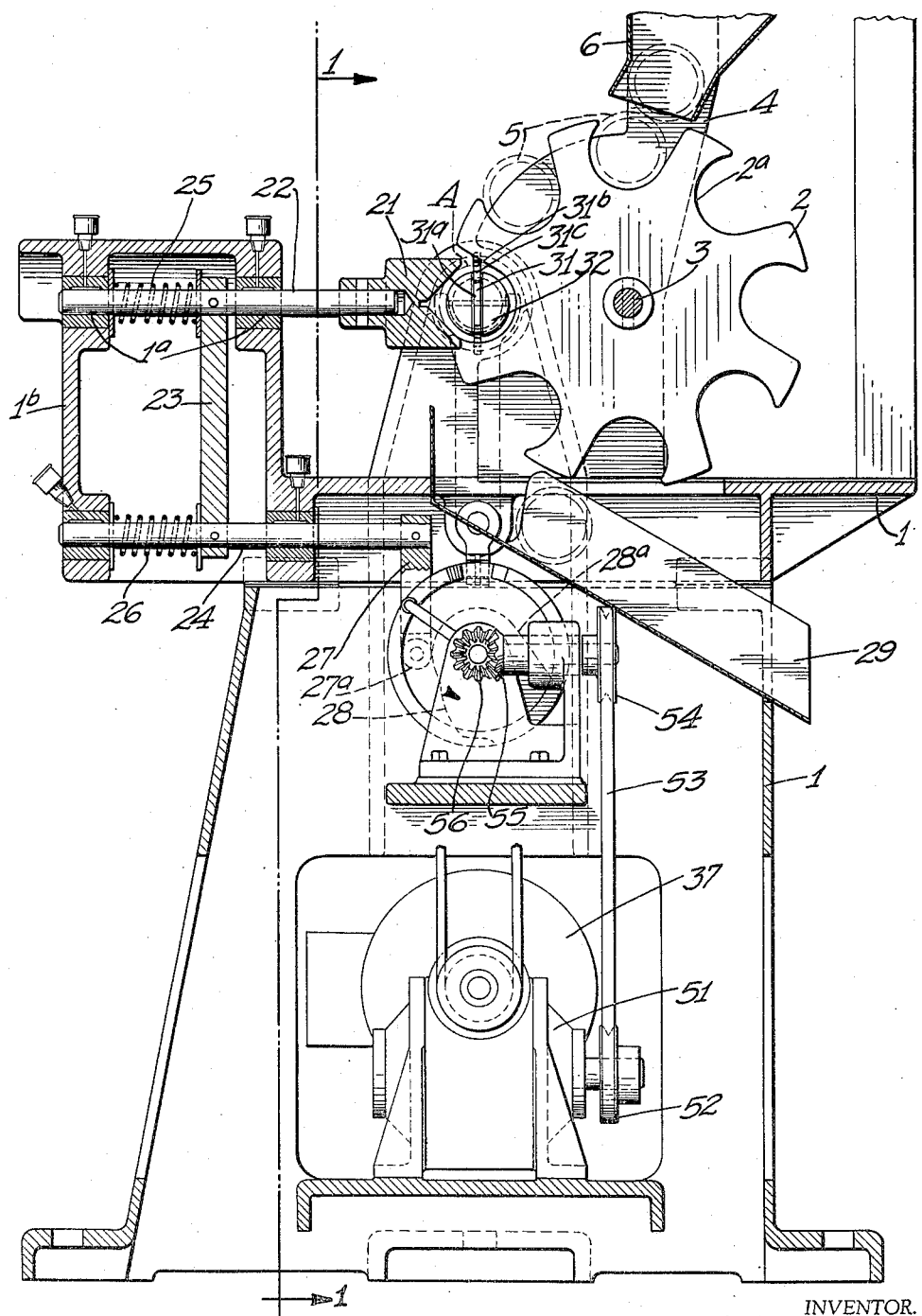
Fig. 2 is another fragmentary sectional elevation taken at right angles to the view shown in Fig. 1, and taken through 2—2 of Fig. 1.
Figure 3:
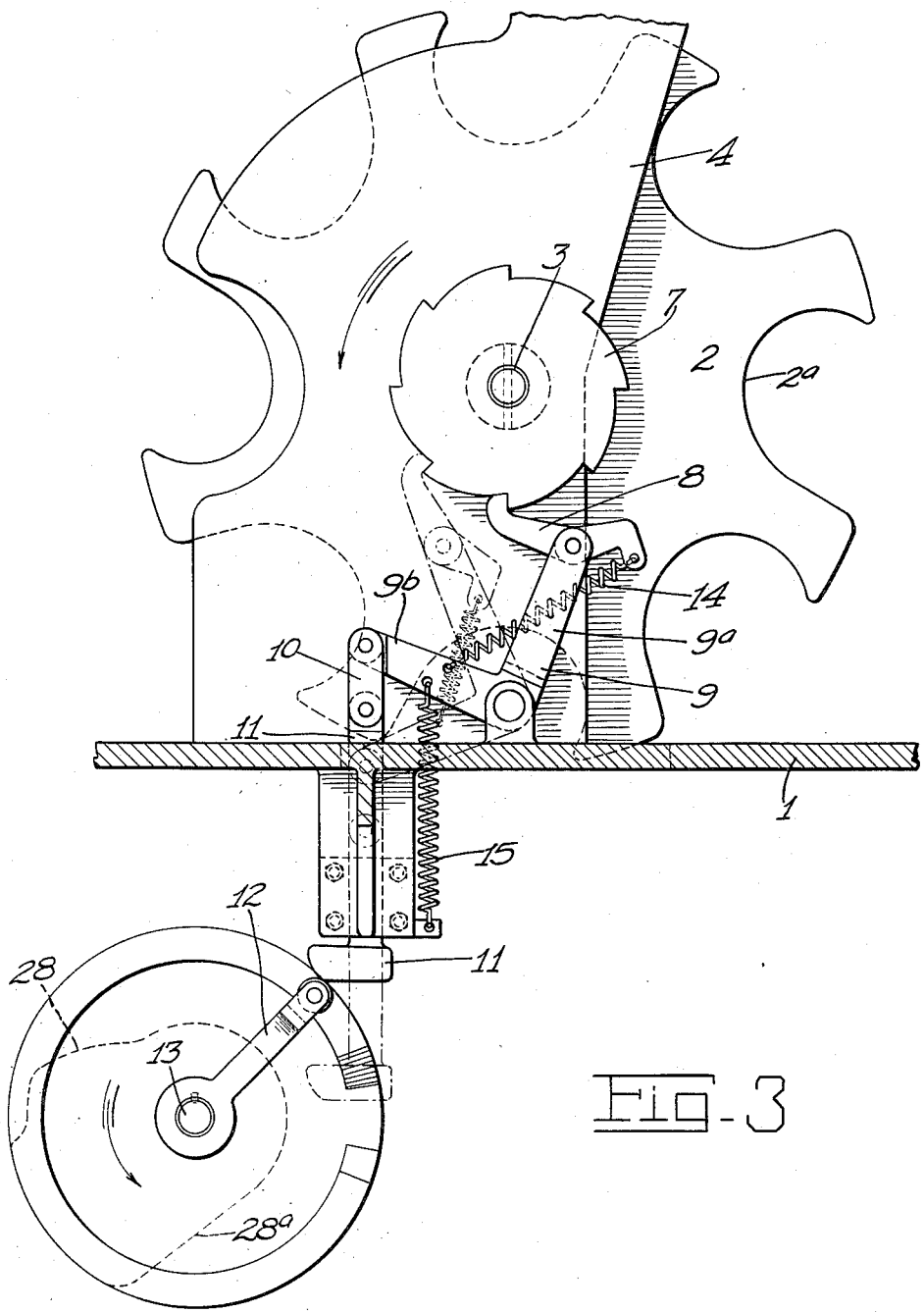
Fig. 3 is an enlarged fragmentary sectional elevation taken through 3—3 of Fig. 1, showing primarily the tube feed means of my invention.

The carrier is rotated intermittently about its axis by a coaxial ratchet 7, which in turn is intermittently rotated by a detent means. The notches of the ratchet 7 are engaged by a pawl 8 pivotally supported intermediate its end on one arm 9ª of a bellcrank lever 9, which is pivotally supported on the frame 1. The end of the other arm 9ᵇ of the bellcrank lever, is pivotally connected, by links 10, to a plunger 11 which is reciprocally mounted in a vertical direction on the frame 1. This plunger or reciprocating member is periodically raised, from the dot and dash to the solid line positions shown in Fig. 3, by a rotating arm 12 which is carried on the cam shaft 13. The pawl 8 is normally held in engagement with the ratchet 7 by a spring 14. The plunger or reciprocating member 11 is normally held in a downward position by another spring 15. Thus when the cam shaft 13 is rotated in the direction of the arrow, shown in Fig. 3, the lower end of the reciprocating member is raised to its solid line position, rocking the bellcrank lever 9 in a clockwise direction, and causing the carrier, consisting of the discs 2, to be rotated in a counter-clockwise direction, as also indicated by the arrow shown in Fig. 3. As the carrier carries a tube, to be machined, to the position designated A in Fig. 2, the tube is clamped in position by a V-shaped clamp block 21 carried at the inner end of a reciprocating shaft 22. This shaft is secured, by a bridge member 23, to a parallel shaft 24, positioned immediately below. These shafts are reciprocally mounted in slide bearings of the frame 1, and move as a unit. These shafts are normally forced to their inward position by a pair of compression springs 25 and 26 positioned around each of the shafts, and between an extended portion 1ᵇ of the frame and the bridge 23, as shown in Fig. 2.

At the inner end of the lower shaft 24 is a downwardly extending cam arm or cam follower 27, which is provided at its lower end with a roller 27ᵃ. This roller is positioned in engagement with the plate or surface cam 28, which is also mounted on the cam shaft 13, above mentioned. As the cam shaft 13 is rotated in a counter-clockwise direction, the inclined portion or rise 28ᵃ of the cam 28 engages the roller 27ᵃ and forces the shafts 22 and 24 outwardly, drawing the clamp block 21 from engagement with the tube held in the cradle of the carrier.

As the clamp block 21 is withdrawn and the carrier is rotated in a counter-clockwise direction, the tube which before was clamped in the carrier is lowered or carried by the carrier in such a position that it rolls from its cradle and is deposited in the discharge chute 29.

While the tube is held in the cradle of the carrier and clamped therein by the clamp block 21, the opposite ends or edges of the tube are machined, or primarily deburred from the burrs which may have been caused by the previous cut-off operation. The deburring tools, which are hereinafter referred to as the cutters, are designated 31. These cutters are substantially U-shaped, consisting of cross-portions 31ᵃ and legs 31ᵇ. The ends of the legs 31ᵇ are provided with V-shaped or forked cutting portions 31ᶜ, the forked cutting portions of both cutters extending toward each other for simultaneously machining or deburring the opposite ends of the tube. It will be noted that the forked cutting portions 31ᶜ of the same cutters are spaced apart the diameter of the tube so that the tube is machined or deburred at diametrically opposite portions of each end.

The connecting portions 31ᵃ of the cutters are pivotally mounted intermediate their ends at the inner ends of adjustable heads 32 carried at the inner ends of axially aligned arbors 33. These arbors are reciprocally mounted in bearing portions 1ᶜ at the upper portion of the frame 1. At the outer ends of the shafts are sheaves 34 which are connected, by V-bolts 35, to sheaves 36, one sheave being mounted on each of the opposite ends of the shaft 37ᵃ of the motor 37.

In the vertical plane of the arbors 33, and in parallel relation with respect thereto, are axially reciprocating shafts 38. The outer ends of these shafts are provided with clutch arms 39. The extended ends of the clutch arms 39 are bifurcated, as indicated by 39ᵃ, and these bifurcated portions extend into annular grooves of arbor shifting members 40 which are secured to said arbors inwardly from the sheaves 34. At the inner ends of the reciprocating shafts 38 are provided downwardly extending arms 41 which carry follower rollers 41ᵃ which are resiliently held, by springs 42, against the outer sides of cylinder cams 43, these being also mounted on the cam shaft 13 and located at the opposite sides of the cam 28.

As the cams 43 are rotated in a counterclockwise direction, the follower rollers 41ᵃ are forced outwardly, by the high portions 43ᵃ of the cams 43, against the compression of the springs 42, forcing the arbors 33 outwardly and causing the cutters to be disengaged from the ends of the tube. It will be here noted that the cutters are normally urged to their inward positions and against the opposite ends of the tubes by the compression springs 42.

The various steps or operations are so coordinated or synchronized, that the tubes, to be machined, or deburred, are fed by the carrier into alignment with the opposed cutters, and are clamped in this position by the clamp block 21. The ends of the tube are then simultaneously machined or deburred. The cutters are thereafter axially withdrawn, followed by the withdrawing of the clamp block 21. The carrier then deposits the machined or deburred tube into the chute 29 and carries a new tube into the machining position.

The motor 37, referred to above, is connected by a suitable reduction gearing 51 (the mechanism thereof not being shown) to a sheave 52, which is connected by a V-belt 53 to a sheave 54. The latter sheave is connected by bevel gears 55 and 56 to the cam shaft 13.

Though I have shown and described a particular construction, combination, and arrangement of parts and portions of the deburring machine referred to, I do not wish to be limited to the same, but desire to include in the scope of my invention the construction, combination, and arrangement substantially as set forth in the appended claims.

I claim:

1. In a machine of the class described, a hopper, a star wheel, mounted below the hopper for removing individual tubes from the hopper, a shaft reciprocally mounted on an axis at right angles to the axis of the star wheel, a jaw mounted at one end of the shaft for engaging one side of a tube held by the star wheel, a spring resiliently forcing the jaw in said holding position, and means for withdrawing said jaw to permit rotation of said star wheel.

2. In a machine of the class described, a star wheel for carrying cylindrical members transversely, a shaft reciprocally mounted on an axis at right angles to the axis of the star wheel, a jaw mounted at one end of the shaft for engaging one side of a tube held by the star wheel, a spring resiliently forcing the jaw in said holding position, and means for withdrawing said jaw to permit rotation of said star wheel.

ROBERT E. BRANCH.

REFERENCES CITED

The following references are of record in the file of this patent:

UNITED STATES PATENTS

| Number | Name | Date |
|---|---|---|
| 766,403 | Vincke | Aug. 2, 1904 |
| 1,538,659 | Ross | May 19, 1925 |
| 1,637,176 | Davis | July 26, 1927 |
| 1,657,101 | Zeitlin | Jan. 24, 1928 |
| 1,657,813 | Andrews | Jan. 31, 1928 |
| 1,981,260 | Yager | Nov. 20, 1934 |
| 2,082,999 | Angel | June 8, 1937 |
| 2,235,083 | Poole | Mar. 18, 1941 |
| 2,276,771 | Hawker | Mar. 17, 1942 |
| 2,388,355 | Fether | Nov. 6, 1945 |